United States Patent [19]

Morisawa et al.

[11] Patent Number: 5,122,822
[45] Date of Patent: Jun. 16, 1992

[54] APPARATUS FOR DETECTING OPEN F NUMBER IN ZOOM LENS CAMERA

[75] Inventors: Tahei Morisawa; Harumi Aoki; Kimiaki Ogawa; Makoto Mogamiya, all of Tokyo, Japan

[73] Assignee: Asahi Kogaku Kogyo Kabushiki Kaisha, Tokyo, Japan

[21] Appl. No.: 415,783

[22] Filed: Oct. 2, 1989

[30] Foreign Application Priority Data

Oct. 4, 1988 [JP] Japan .................. 63-130181[U]

[51] Int. Cl.$^5$ .............................................. G03B 1/18
[52] U.S. Cl. ................. 354/195.1; 354/271.1
[58] Field of Search ............... 354/400, 435, 439, 452, 354/437, 195.1, 195.11, 271.1, 274, 455; 350/429

[56] References Cited

U.S. PATENT DOCUMENTS

| | | | |
|---|---|---|---|
| 4,159,864 | 7/1979 | Yasukuni et al. | 354/195.11 |
| 4,429,973 | 2/1984 | Kawasaki et al. | 354/271.1 |
| 4,446,526 | 5/1984 | Iwanade | 350/429 |
| 4,464,040 | 8/1984 | Okura et al. | 354/455 |
| 4,473,278 | 9/1984 | Hama | 350/429 |
| 4,511,221 | 4/1985 | Komoto | 350/429 |
| 4,558,940 | 12/1985 | Tano et al. | 354/455 |
| 4,572,645 | 2/1986 | Yoshida et al. | 354/435 |
| 4,621,918 | 11/1986 | Kawasaki et al. | 354/271.1 |
| 4,750,821 | 6/1988 | Yamamoto et al. | 350/429 |
| 4,816,859 | 3/1989 | Maruyama et al. | 354/400 |

FOREIGN PATENT DOCUMENTS 1484414 9/1977 United Kingdom .
2100026 12/1982 United Kingdom .

*Primary Examiner*—L. T. Hix
*Assistant Examiner*—David M. Gray
*Attorney, Agent, or Firm*—Sandler, Greenblum & Bernstein

[57] ABSTRACT

An apparatus for detecting an open F number in a zoom lens camera including a cam ring which rotates to vary the focal length of a zoom lens, a reflection plate which is secured to the outer periphery of the cam ring and which has light reflecting portions and non-reflecting portions alternately arranged, as viewed along the circumferential direction of the cam ring, a photoreflector which emits light onto the reflection plate and which detects light reflected by the reflection plate, and an arithmetic device which calculates an open F number of the zoom lens using the output of the photoreflector.

6 Claims, 4 Drawing Sheets

APPARATUS FOR DETECTING OPEN F NUMBER IN ZOOM LENS CAMERA

BACKGROUND OF THE INVENTION

1. Field of the Invention

The present invention relates to an apparatus for detecting an open F number in a zoom lens camera.

2. Description of Related Art

In the zoom lens camera, a physical aperture diameter A is usually a constant value so that the open F number (i.e., the minimum F number) varies in accordance with the focal length f ($F=f/A$). The control of exposure, for instance a the open F number, and accordingly, the open F number must be input into an exposure control device to control the exposure. To this end, a conventional zoom lens having an automatic exposure function usually has means for detecting the open F number.

In a known open F number detecting device, a code plate of 4 bits is provided on the outer periphery of a cam ring which rotates to effect a zooming operation. The code plate is brought into contact with brushes to detect the angular position of the cam ring. This kind of detecting device, in which the angular position of the cam ring is detected by the code plate is advantageous in that the angular position can be detected as an absolute position only by the code plate bit data. However, such a known detecting device also has drawbacks, in that the manufacturing cost of the code plate is expensive, and in that detecting errors tend to occur because of failure in the electrical connection between the code plate and the brushes, if foreign matter enters therebetween. Furthermore, there is a possibility of chatter occuring between a conductive foil from which the code plate is manufactured and the brushes, resulting in the production of noise during zooming.

SUMMARY OF THE INVENTION

The primary object of the present invention is to provide an open F number detecting apparatus in which the angular position of the cam ring can be detected by pulses which are produced in accordance with the rotation of the cam ring during zooming. A pulse generator which is incorporated in the detecting apparatus of the present invention is trade simply from a noncontacting type of optical pulse generator, so that the problems mentioned above which are caused by failure of electrical contact can be solved.

To achieve the object mentioned above, in an apparatus for detecting an open F number in a zoom lens camera comprising a cam ring which rotates about an optical axis, a zooms lens has a the focal length variable in accordance with the rotation of the cam ring, and a detecting means for detecting the focal length and the open F number based on the angular position of the cam ring. According to the present invention, the apparatus further comprises extremity detecting means for detecting one of the extreme angular positions of the cam ring, a pulse generator positioned between the cam ring and a stationary member for generating pulses in accordance with rotation of the cam ring, a rotational direction detecting means for detecting the direction of the rotation of the cam ring, and an open F number arithmetic means for adding or subtracting the pulses generated by the pulse generator, in accordance with the direction of the rotation of the cam ring detected by the rotational direction detecting means so as to detect an angular displacement of the cam ring from the extremity detected by the extremity detecting means in order to calculate an open F number corresponding to the angular displacement.

Preferably, the pulses are easily processed by a microcomputer. Also preferably, the pulse generator comprises a noncontact optical pulse generator, resulting in a simplified construction and no occurrence of any failure of contact.

Preferably, the pulse generator varies the frequency of pulses it generates in accordance with changes in a unit rotational angle of the cam ring, so that the open F number necessary for the control of the exposure can be detected by a reduced number of pulses.

BRIEF DESCRIPTION OF THE DRAWINGS

The invention will be described below in detail with reference to the accompanying drawings, in which.

DESCRIPTION OF PREFERRED EMBODIMENT

Figure 3:
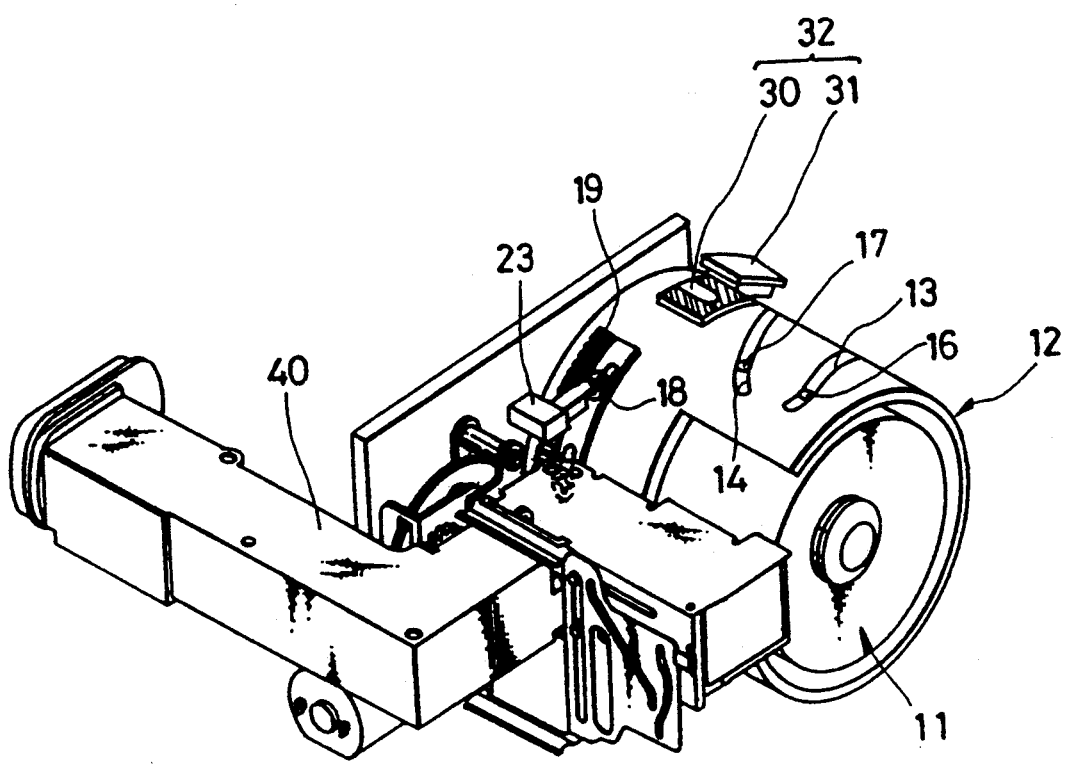
FIG. 3 is a perspective view of a pulse generator according to the present invention; and, FIGS. 4A and 4B are front elevational views of a cam ring shown at different extreme rotational positions thereof.
Figure 4A:
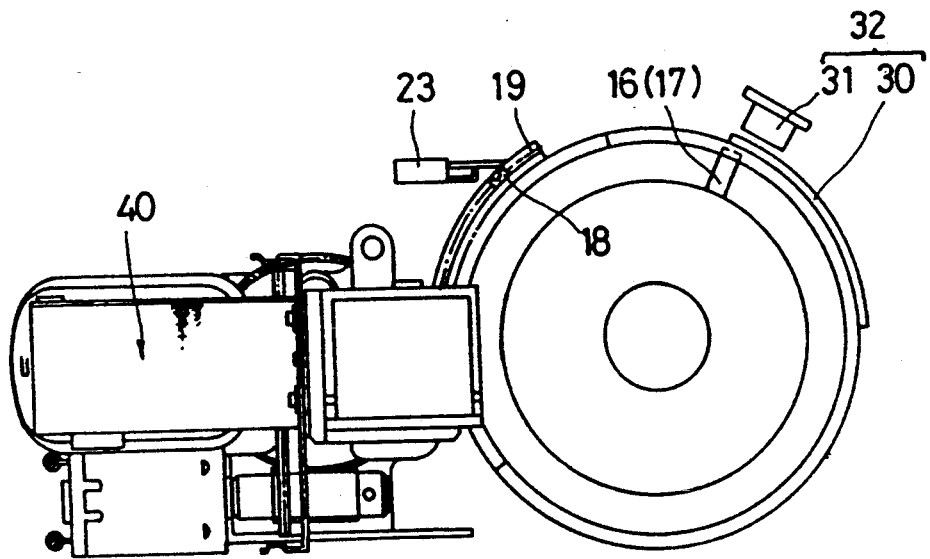
Figure 4B:
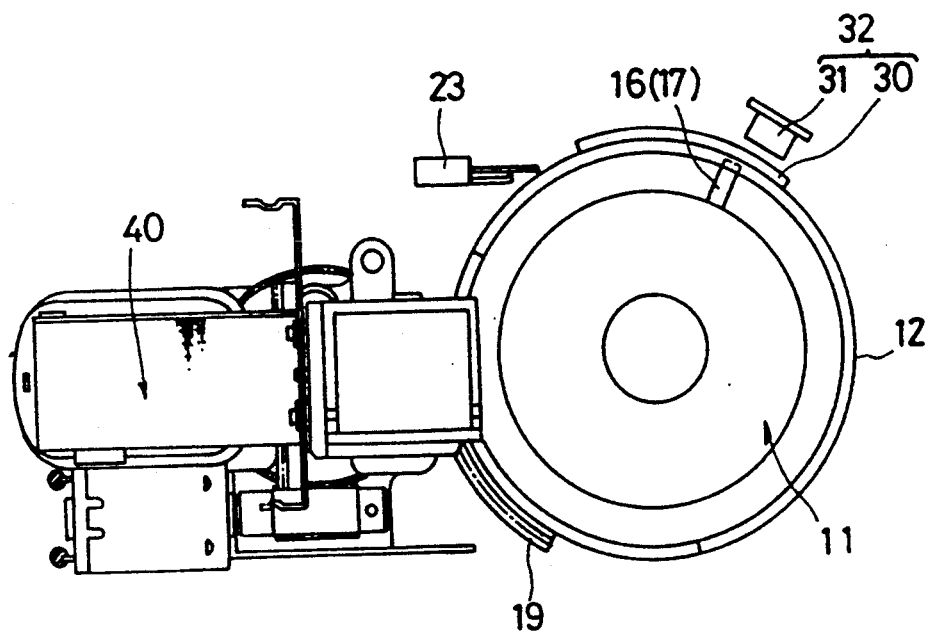

As shown in FIGS. 3, 4A and 4B, a zoom lens 11 has a zooming cam ring 12 on the outer periphery thereof, which itself has zooming cam grooves 13 and 14 for varying the focal length of the zoom lens 11. Namely, within zooming cam grooves 13 and 14 guide pins 16 and 17 are fitted which are formed integrally with front and rear groups of lenses (not shown), respectively. A sector gear 19 is secured to the outer periphery of the cam ring 12 by set screws 18.

Figure 1:
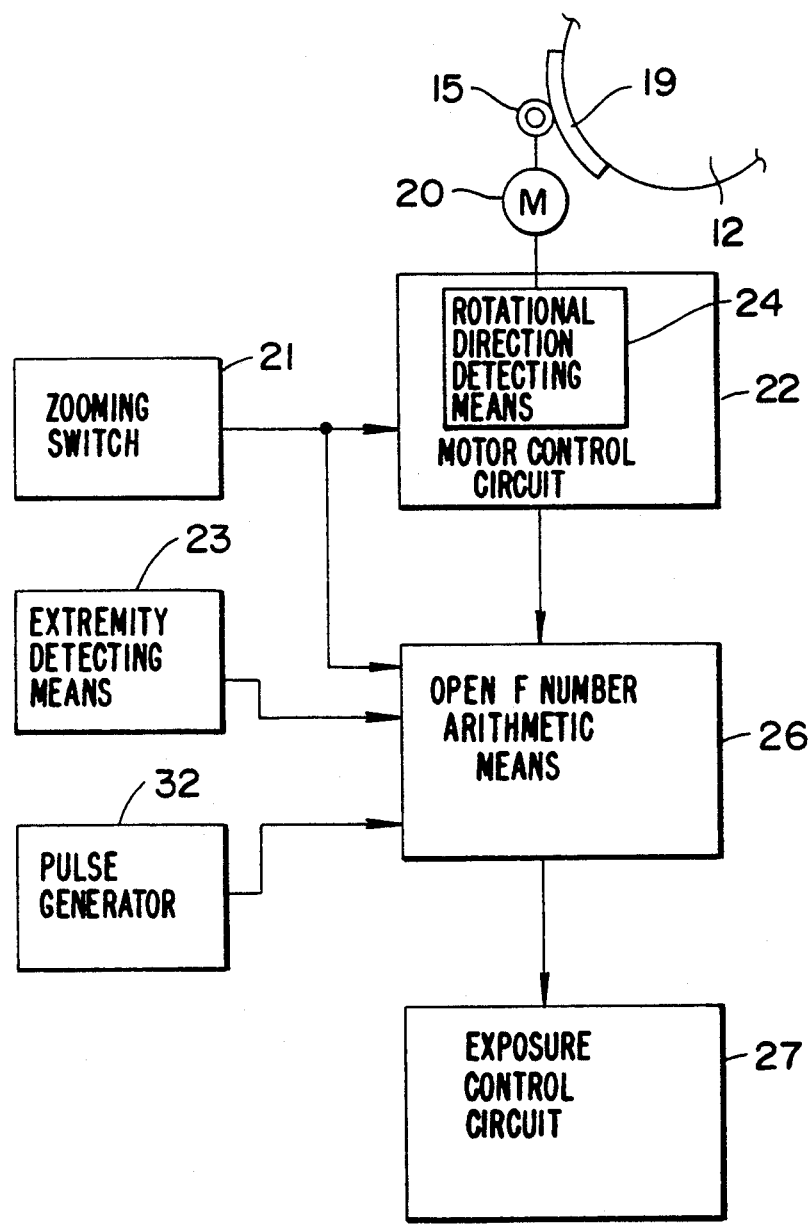
FIG. 1 is a block diagram of a detecting apparatus of an open F number in a zoom lens according to one aspect of the present invention.

The sector gear 19 is engaged by a pinion 15 which is rotated in opposite directions (forward and reverse directions) by a reversible motor 20, as shown in FIG. 1. The motor 20 is driven to rotate in both of the forward and reverse directions by a motor control circuit 22 which receives a control signal from a zooming switch (Tele-Wide switch) 21, so that when the cam ring 12 rotates in the forward and reverse directions, the front and rear groups of lenses can be moved in the optical axis directions in accordance with the profiles of the zooming cam grooves 13 and 14 to change the distance between the lens groups, thereby to effect the zooming operation of the zoom lens 11.

Figure 2A:
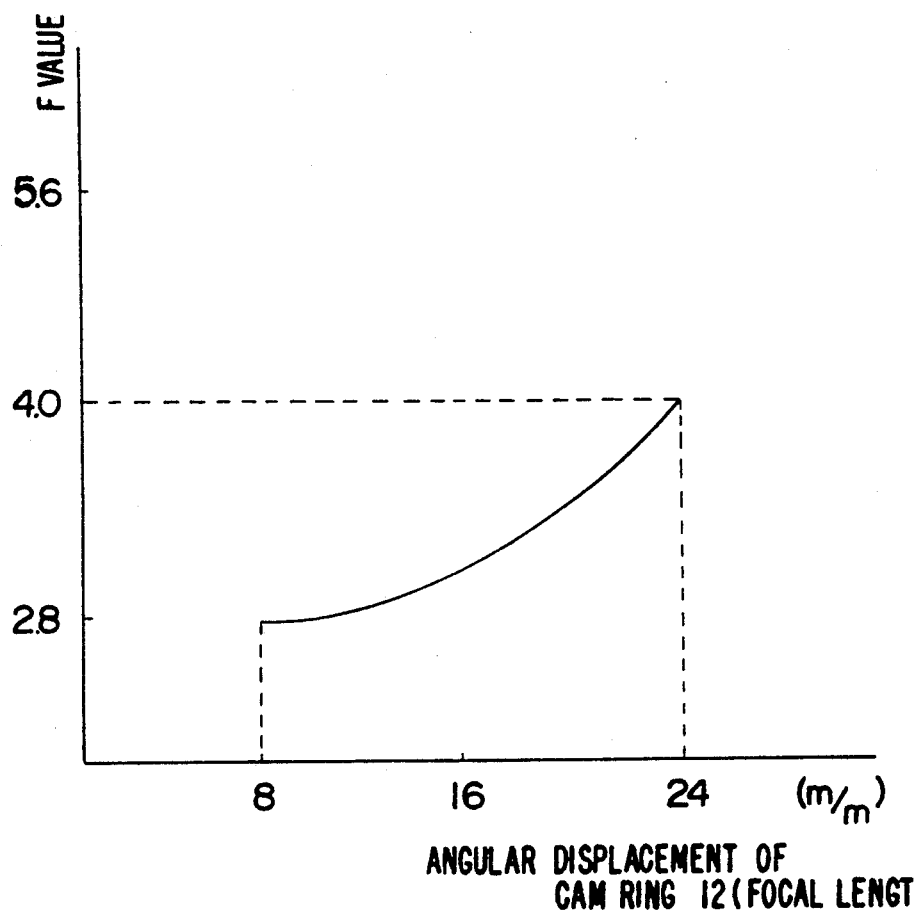
FIG. 2A is a diagram showing the relationship between an open F number and the rotational angle of a cam ring.
Figure 2B:
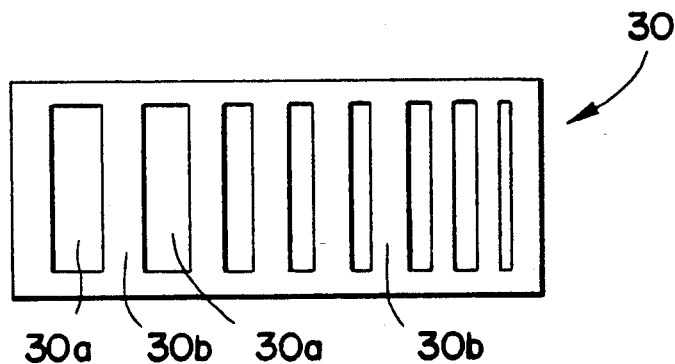
FIG. 2B is a developed view of a reflection plate used in a pulse generator.

The cam ring 12 is provided on its outer periphery with a reflection plate 30 secured thereto, which is disposed oppositely with respect to a photoreflector (or reflection type photointerrupter) 31 which is provided on a stationary portion (not shown) of a camera body. The reflection plate 30 and the photoreflector 31 constitute an optical pulse generator 32. The photoreflector 31, which is per se known, emits light and detects light reflected by a reflection portion of the reflecting plate 30. The reflection plate 30 has elongated light reflecting portions (light intercepting portions) 30a and elongated non-reflecting portions (light passing portions) 30b, both extending parallel to the optical axis and arranged alternately side by side, as shown in FIG. 2B. The reflecting portions 30a and the non-reflecting portions 30b have different widths, so that they have relatively small widths at the positions of the cam ring 12 which correspond to large variations of the open F number and relatively large widths at the positions of the cam ring 12 that correspond to small variations of the open F number, based on upon the graph as shown in FIG. 2A. FIG. 2A shows the relationship between the rotational angle of the cam ring 12 and the variation of the open F number. Note that the frequency of the pulses increases as the widths of the reflecting portions 30a and non-reflecting portions 30b decrease, and vice versa. Namely, the relationship between the rotational angle of the cam ring 12 and the frequency of pulses generated by the pulse generator exhibits a non linear curve.

Outside of the cam ring 12, an extremity detecting switch 23 is provided which detects one of the extremities of the angular displacement of the cam ring 12, e.g., the extremity on the shortest focal length side. The extremity detecting switch 23 can comprise, e.g., a switch which is turned OFF when it is pushed by a projection located at a specific position of the outer periphery of the cam ring 12. In the illustrated embodiment, the projection provided on the outer periphery of the cam ring 12 to make the extremity detecting switch 23 OFF comprises one of the set screws 18 which are adapted to secure the sector gear 19 to the cam ring 12.

The direction of the rotational movement of the cam ring 12 is detected by a rotational direction detecting means 24 provided in the motor control circuit 22 (FIG. 1), or a zooming switch 21.

The signals (outputs) from the extremity detecting switch 23, the rotational direction detecting means 24 (or the zooming switch 21), and the optical pulse generator 32, are supplied to an open F number arithmetic means 26. The open F number arithmetic means 26 adds or subtracts the pulses which are generated by the optical pulse generator 32 in accordance with the rotation of the cam ring 12; in accordance with the direction of the rotational movement of the cam ring 12 which is detected by the rotational direction detecting means 24 to detect the angular displacement of the cam ring 12 from one extremity position of the cam ring which is detected by the extremity detecting switch 23, whereby an open F number corresponding to a given angular displacement can be arithmetically obtained.

Here, it is assumed that when a main switch (not shown) of the camera is turned OFF, the cam ring 12 stops at one of the two extremities, e.g., the position corresponding to the shortest focal length in this embodiment. The open F number corresponding to the extremity is F 2.8, and the corresponding focal length of the zoom lens 11 is 8 mm, as can be seen in FIG. 2A. When the main switch is actuated in this state to drive the zooming switch 21, the motor control circuit 22, and the reversible motor 20 in order to rotate the cam ring 12 towards a longer focal length side, one pulse is generated every time the boundary portions of the reflecting portions 30a and non-reflecting portion 30b pass the photoreflector 31 (more exactly speaking, each time that light is emitted by the photoreflector). The open F number arithmetic means 26 adds and subtracts the number of generated pulses when the cam ring rotates toward the longest focal length side and toward the shortest focal length side, respectively. Consequently, the open F number can be obtained by the number of pulses thus counted.

In the embodiment shown in FIG. 2B, the focal length and the open F number of the zoom lens 11 are 24 mm and F 4, respectively, when the number of pulses reaches 16, because the number of boundary portions of the reflecting portions 30a and the non-reflecting portions 30b is 16. It goes without saying that the open F number varies in a stepwise fashion between F 2.8 and F 4 for intermediate pulse numbers. The open F number is supplied to an exposure control circuit 27 to control the exposure.

FIGS. 4A and 4B demonstrate two extremes of the rotational angular position of the cam ring 12. Numeral 40 in FIGS. 3, 4A and 4B designates a zoom finder device.

As can be understood from the above discussion, according to the present invention, the open F number can be detected without using the code bit data. Since the pulse generator comprises a noncontact optical pulse generator, not only can the mechanical construction of the apparatus be simplified, but also failure of contact can be prevented. Furthermore, by using a pulse generator in which the frequency of pulses varies in accordance with the variation of the open F number for a given unit rotational angle of the cam ring, the open F number necessary for the control of exposure can be detected by a decreased number of pulses.

We claim:

1. An apparatus for detecting an open F number in a zoom lens camera comprising a cam ring which rotates about an optical axis along a path extending between extreme angular positions, a zoom lens which has a focal length variable in accordance with the rotation of the cam ring, and detecting means for detecting the focal length and the open F number based upon the rotated angular position of the cam ring, said detecting means further comprising:

extremity detecting means for detecting one of said extreme angular positions of rotation of the cam ring, a pulse generator positioned between the cam ring and a stationary member on a camera body for generating pulses in accordance with rotation of the cam ring, a rotational direction detecting means for detecting the direction of rotation of the cam ring, and an open F number arithmetic means for adding or subtracting pulses generated by the pulse generator in accordance with the direction of the rotation of the cam ring detected by the rotational direction detecting means to detect an angular displacement of the cam ring, from an extreme angular position detected by the extremity detecting means, in order to calculate an open F number corresponding to the angular displacement.

2. An apparatus according to claim 1, wherein said pulse generator varies the frequency of the pulses generated by said generator in accordance with variations in the open F number for a unit rotational angle of the cam ring.

3. An apparatus according to claim 2, wherein said pulse generator is an optical pulse generator.

4. An apparatus according to claim 3, wherein said optical pulse generator comprises a reflection plate and a photoreflector.

5. An apparatus for detecting an open F number in a zoom lens camera comprising a cam ring which rotates to vary the focal length of a zoom lens, a reflection plate which is secured to an outer periphery of the cam ring, said reflection plate having light reflecting portions and non-reflecting portions which are alternatively arranged along the circumferential direction of the cam ring, a photoreflector which emits light onto the reflection plate and detects light reflected by the reflection plate, and an arithmetic means for calculating an open F number of the zoom lens using the output of the photoreflector, wherein said light reflecting portions and the non-reflecting portions have different widths in the circumferential direction of the cam ring.

6. An apparatus according to claim 5. wherein the widths of the light reflecting portions and the light non-reflecting portions increase in association with decreases in the variation of the open F number for a unit rotational angle of the cam ring.

* * * * *